(12) United States Patent
Tucker, III et al.

(10) Patent No.: US 7,266,469 B1
(45) Date of Patent: Sep. 4, 2007

(54) METHOD AND ARTICLE OF MANUFACTURE FOR DETERMINING A RATE OF CHANGE OF ORIENTATION OF A PLURALITY OF FIBERS DISPOSED IN A FLUID

(75) Inventors: Charles L. Tucker, III, Savoy, IL (US); Jin Wang, Urbana, IL (US); John F. O'Gara, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/442,560

(22) Filed: May 25, 2006

(51) Int. Cl.
*G01C 9/00* (2006.01)
(52) U.S. Cl. .................. 702/150; 434/300; 700/204; 425/3; 425/432; 425/456; 425/522; 425/542; 361/225; 73/382; 73/505; 73/67.2
(58) Field of Classification Search ............... 702/150; 434/306; 700/204; 425/3, 432, 456, 522, 425/542; 361/225; 73/382 R
See application file for complete search history.

(56) References Cited

OTHER PUBLICATIONS

Advani et al., The Use of Tensors to Describe and Predict Fiber Orinetation in Short Fiber Composites, 1987, john Wiley and Sons, Inc.*
S.G. Advani and C.L. Tucker, III, The Use of Tensors to Describe and Predict Fiber Orientation in Short Fiber Composites J. Rheol., 31:751-784, 1987.
R.S. Bay and C.L. Tucker, III, Fiber Orientation in Simple Injection Moldings, Part 1: Theory and Numerical Methods, Polym. Compos., 13(4):317-331, 1992a.
R.S. Bay and C.L. Tucker, III, Fiber Orientation in Simple Injection Moldings, Part II: Experimental Results, Polym. Compos., 13(4):332-342, 1992b.
J.S. Cintra, Jr. and C.L. Tucker, III, Orthotropic closure approximations for Flow-Induced Fiber Orientation, J. Rheology, 39:1095-1122, 1995.
H.M. Huynh, Improved Fiber Orientation Predictions for Injection-Molded Composites, Master's Thesis, University of Illinois at Urbana-Champaign, 2001.
G.B. Jeffery, The Motion of Elipsoidal Particles Immersed in a Viscous Fluid, Proc. Roy. Soc., A102:161-179, 1922.

(Continued)

*Primary Examiner*—Hal Wachsman
*Assistant Examiner*—Sujoy Kundu
(74) *Attorney, Agent, or Firm*—David P. Wood

(57) ABSTRACT

A method and an article of manufacture for determining a rate of change of orientation of a plurality of fibers disposed in a fluid are provided. The method includes determining a first tensor indicative of the rate of change of orientation of the plurality of fibers in the fluid in a predetermined region due to rigid body rotation of the plurality of fibers and the fluid. The method further includes determining a second tensor indicative of the rate of change or orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid. The method further includes determining a third tensor indicative of a total rate of change of orientation of the plurality of fibers based on the first and second tensors, wherein the third tensor is an objective tensor.

23 Claims, 9 Drawing Sheets

OTHER PUBLICATIONS

C.L. Tucker, III and S.G. Advani, Processing of Short-FIber Systems, In S.G. Advani, editor, Flow and Rheology In Polymer Composites Manufacturing, pp. 147-202, Elsevier, Amsterdam, 1994.

B.E. VeWeyst, Numerical Predictions of Flow-Induced Fiber Orientation in 3-D Geometrics, PhD thesis, University of Illinois at Urbana-Champaign, Urbana, IL 1998.

* cited by examiner

METHOD AND ARTICLE OF MANUFACTURE FOR DETERMINING A RATE OF CHANGE OF ORIENTATION OF A PLURALITY OF FIBERS DISPOSED IN A FLUID

BACKGROUND

Technical Field

This application relates to a method and an article of manufacture for determining a rate of change of orientation of a plurality of fibers disposed in a fluid.

When a fiber-reinforced plastic is injected in a mold cavity utilizing an injection molding process, a flow of the plastic in the mold cavity orients the fibers. The resulting fiber orientation pattern determines many properties of the molded part, including stiffness, strength, thermal expansion, warpage, and shrinkage.

A mathematic model has been developed that attempts to predict a rate of change of orientation of fibers during injection of plastic into a mold cavity. A problem with the model is that the predicted rate of change of orientation of the fibers has significant deficiencies, particularly in parts with relatively short flow lengths and relatively fast filling speeds. In particular, the predicted rate of change of orientation of the fibers is greater than an observed rate of change or orientation of the fibers.

Accordingly, the inventors herein have recognized a need for an improved method for determining a rate of change of orientation of fibers in a fluid.

SUMMARY OF THE INVENTION

A method for determining a rate of change of orientation of a plurality of fibers disposed in a fluid in accordance with an exemplary embodiment is provided. The method includes determining a first tensor indicative of the rate of change of orientation of the plurality of fibers in the fluid in a predetermined region due to rigid body rotation of the plurality of fibers and the fluid. The method further includes determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid. The method further includes determining a third tensor indicative of a total rate of change of orientation of the plurality of fibers based on the first and second tensors, wherein the third tensor is an objective tensor.

An article of manufacture in accordance with another exemplary embodiment is provided. The article of manufacture includes a computer storage medium having a computer program encoded therein for determining a rate of change of orientation of a plurality of fibers disposed in a fluid. The computer storage medium includes code for determining a first tensor indicative of the rate of change of orientation of the plurality of fibers in the fluid in a predetermined region due to rigid body rotation of the plurality of fibers and the fluid. The computer storage medium further includes code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid. The computer storage medium further includes code for determining a third tensor indicative of a total rate of change of orientation of the plurality of fibers based on the first and second tensors, wherein the third tensor is an objective tensor.

DESCRIPTION OF EXEMPLARY EMBODIMENTS

Figure 1:
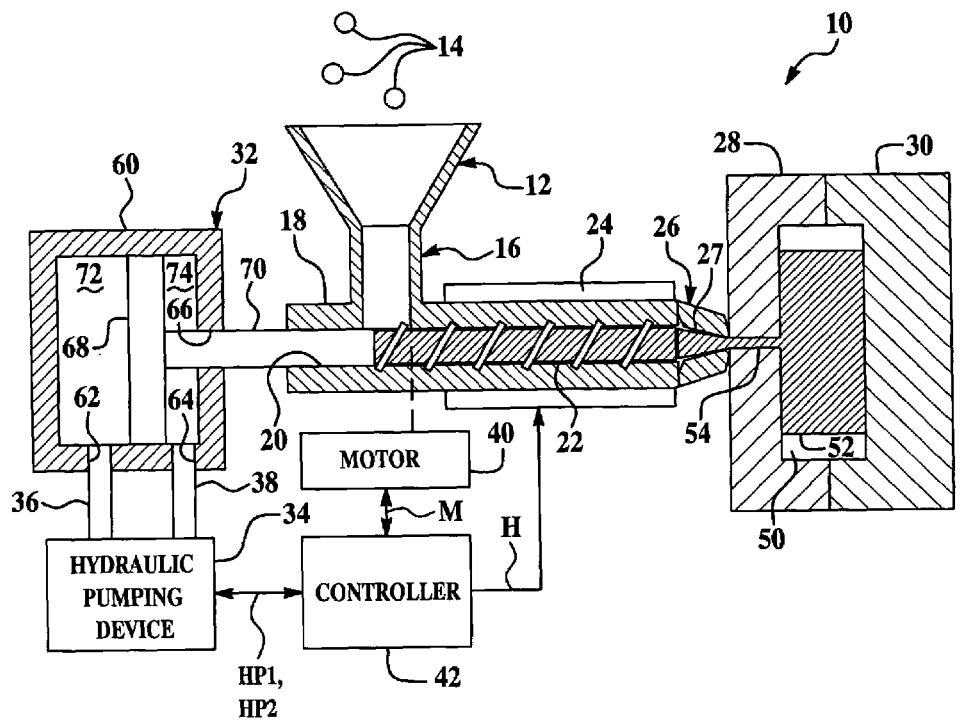
FIG. 1 is a schematic of an exemplary injection molding system having a pair of mold members configured to form a center-gated disk.

Referring to FIG. 1, an injection molding system 10 for forming parts utilizing a polymeric fluid containing a plurality of fibers is illustrated. The injection molding system 10 includes a hopper 12, polymeric pellets 14, a throat member 16, a barrel member 18, a screw member 22, a heater 24, a nozzle 26, mold members 28, 30, a hydraulic actuator 32, a hydraulic pumping device 34, conduits 36, 38, a motor 40, and a controller 42.

The hopper 12 is configured to receive a plurality of polymeric pellets 14 and to direct the polymeric pellets 14 into the throat member 16. The polymeric pellets 14 comprise a polymeric material having a plurality of fibers therein. In an exemplary embodiment, the polymeric material comprises a thermoplastic. In another exemplary embodiment, the polymeric fluid comprises a thermosetting polymeric material. Of course, it should be noted that any polymeric material known to those skilled in the art can be utilized in the polymeric pellets, or combinations thereof. The plurality of fibers can be constructed from one or more of: glass fibers, carbon fibers, and aramid fibers, or the like, for example. Further, in an exemplary embodiment, the plurality of fibers have a length in a range of 100-700 microns, and a diameter in a range of 4-20 microns. Of course, it should be understood that in alternative embodiments, the plurality of fibers can have a length of less than 100 microns or greater than 700 microns. Further, the plurality of fibers can have a of diameter less than 4 microns or greater than 20 microns.

The throat member 16 is disposed between the hopper 12 and the barrel member 18. The throat member 16 is provided to direct the polymeric pellets 14 from the hopper 12 to the barrel number 18.

The barrel member 18 is provided to receive the polymeric pellets 14 from the throat member 16 and to route the polymeric pellets 14 toward the nozzle 26. The barrel member 18 is substantially tubular shaped and includes an aperture 20 extending longitudinally therethrough.

The screw member 22 is disposed within the aperture 20 of the barrel member 18. The screw member 22 is rotated via the motor 40 in response to the motor 40 receiving a control signal (M) from the controller 42.

The heater 24 is provided to heat the barrel member 18 such that the polymeric pellets transition into a polymeric fluid that flows into the nozzle 26. The heater 24 generates heat in response to a control signal (H) from the controller 42.

The hydraulic actuator 32 is provided to move the screw member 22 longitudinally in a first direction through the aperture 20 toward the nozzle 26, to urge the polymeric fluid through the aperture 27 of the nozzle 26 and further through the aperture 54 of the mold member 28 into a cavity 50. The hydraulic actuator 32 includes a housing 60, a cylinder head 68, and a shaft 70. The cylinder head 68 is disposed within the housing 60 and defines regions 72, 74 for receiving a hydraulic fluid therein via apertures 62, 64, respectively, extending through a wall of the housing 60. The shaft 70 is coupled to a side of the cylinder head 68 and extends through an aperture 66 extending through a wall of the housing 60. The shaft 70 further extends through a portion of the aperture 20 of the barrel member 18 and is coupled to an end of the screw member 22.

The hydraulic pumping device 34 is provided to route hydraulic fluid to the hydraulic actuator 32 for moving the screw member 22 in: (i) a first longitudinal direction in response to a control signal (HP1) from the controller 42, and (ii) in a second longitudinal direction, opposite the first longitudinal direction, in response to a control signal (HP2) from the controller 42. In particular, when the hydraulic pumping device 34 receives the signal (HP1), the device 34 routes fluid through the conduit 36 into the region 72. In response, the cylinder head 68 and the shaft 70 move in a first longitudinal direction to urge the screw member 22 toward the nozzle 26. This movement urges the polymeric fluid into the cavity 50 defined by the mold members 28, 30. Alternatively, when the hydraulic pumping device 34 receives the signal (HP2), the device 34 routes a hydraulic fluid through the conduit 38 into the region 74. In response, the cylinder head 68 and the shaft 70 move in the second longitudinal direction, opposite the first longitudinal direction, to urge the screw member 22 away from the nozzle 26.

It should be noted that in an alternative embodiment, the screw member 22 can be moved longitudinally through the aperture 20 toward the nozzle 26 utilizing an electric motor, instead of the hydraulic actuator 32 and the hydraulic pumping device 34.

Figure 2:
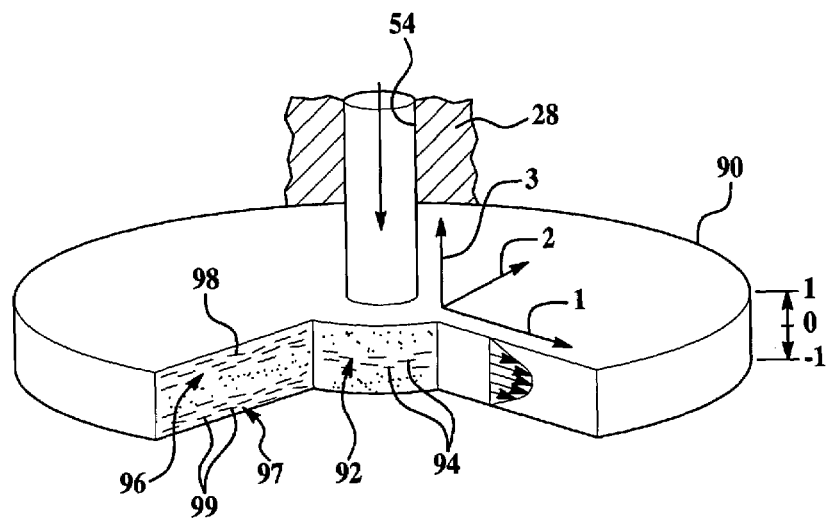
FIG. 2 is a schematic of a center-gated disk formed by the injection molding system of FIG. 1.

Referring to FIGS. 1 and 2, the mold members 28, 30 are provided to define the cavity 50 for forming a center-gated disk 90 therein utilizing the polymeric fluid 52. The mold members 28, 30 are constructed from either steel or aluminum, for example. The mold member 28 has an aperture 50 extending therethrough that is in fluid communication with both the aperture 26 of the nozzle 27 and the cavity 50. During operation, the polymeric fluid 52 flows from the aperture 27 through the aperture 54 into the cavity 50.

The controller 42 is provided to execute algorithms for controlling operation of the injection molding system 10. The controller 42 operably communicates with the motor 40, the hydraulic pumping device 34, and the heater 24. The controller 42 is configured to generate the control signal (M) for controlling operation of the motor 40. The controller 42 is further configured to generate signals (HP1) and (HP2) for controlling operation of the hydraulic pumping device 34. The controller 42 is further configured to generate the signal (H) for controlling operation of the heater 24.

For purposes of understanding, in the various Figures the axis labeled "1" or "1-axis" corresponds to a flow direction, the axis labeled "2" or "2-axis" corresponds to a cross-flow direction, and the axis labeled "3" or "3-axis" corresponds to a thickness of material direction. Further, the term $A_{11}$ refers to the degree of orientation of fibers along the 1-axis, the term $A_{22}$ refers to the degree of orientation of fibers along the 2-axis, and the term $A_{33}$ refers to the degree of orientation of the fibers along the 3-axis.

Figure 3:
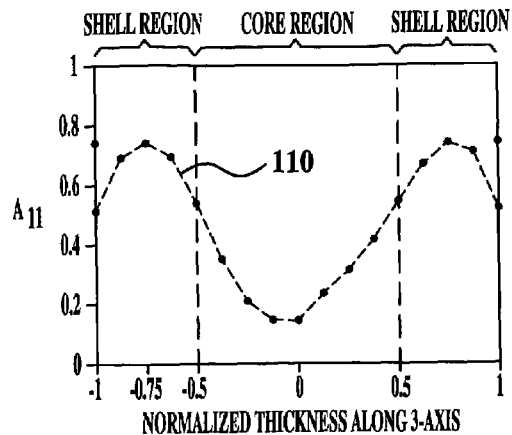
FIG. 3 is a graph of a curve wherein each point of the curve indicates an orientation of a plurality of fibers in a particular region of the center-gated disk of FIG. 2.

Referring to FIG. 2, an orientation of the fibers disposed within the polymeric fluid 52 disposed in the cavity 50 of mold members 28, 30 for forming the center-gated disk 90 will now be discussed. For example, in a core region 92 of the center-gated disk 90, a plurality of fibers 94 generally align in a cross-flow orientation with respect to a direction of the flow of the polymeric fluid 52. Further, in shell regions 96, 97 disposed on opposite sides of the core region 92, the plurality of fibers 98, 99, respectively generally align in a flow aligned orientation with respect to a flow direction of the polymeric fluid 52. Referring to FIG. 3, an exemplary curve 100 indicating an orientation of the fibers along the flow 1-axis is illustrated. The curve 100 indicates that a center of the core region (e.g., normalized thickness=0), significantly less than half of the fibers are oriented in the flow direction (e.g., $A_{11}=0.2$). Further, the curve 100 indicates that in the shell region at a normalized thickness of −0.75, significantly more than half of the fibers align with the flow axis (e.g., $A_{11}=0.75$).

Figure 4:
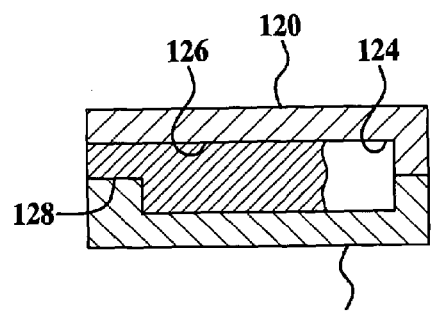
FIG. 4 is a schematic of a pair of mold members configured to form an end-gated plaque.

Referring to FIG. 4, the mold members 120, 122 are provided to define a cavity 124 for forming an end-gated plaque 140 therein utilizing the polymeric fluid 52. It should be noted that when mold members 120, 122 are utilized, the mold members would be operably coupled to the nozzle 26 instead of the mold members 28, 30. The mold members 120, 122 are constructed from either steel or aluminum, for example. Further, the mold members 120, 122 have an aperture 128 for extending therethrough that is in fluid communication with both the aperture 27 of the nozzle 26 and a cavity 124 defined by mold members 120, 122. During operation, the polymeric fluid 52 flows from the aperture 27 through the aperture 128 into the cavity 124.

Figure 5:
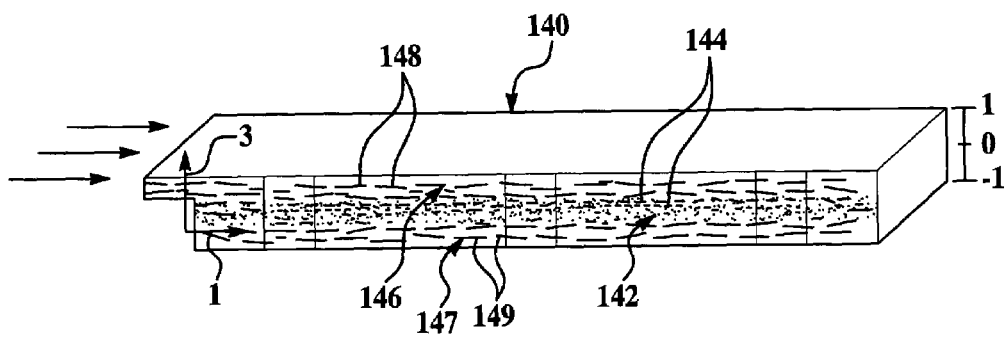
FIG. 5 is a schematic of an end-gated plaque formed by the injection molding system of FIG. 1 using the pair of mold members of FIG. 4.
Figure 6:
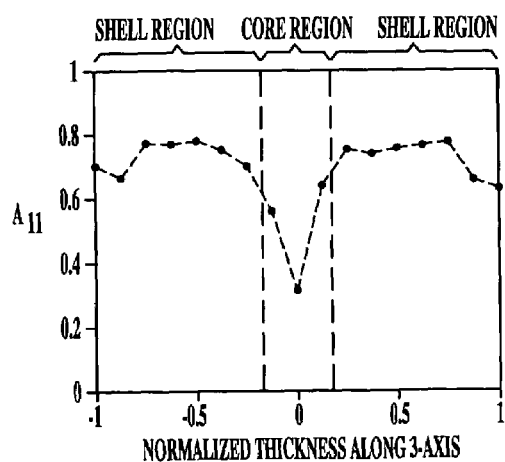
FIG. 6 is a graph of a curve wherein each point of the curve indicates an orientation of a plurality of fibers in a particular region of the end-gated plaque of FIG. 4.

Referring to FIG. 5, an orientation of the fibers disposed within the polymeric fluid 52 disposed in the cavity 124 of mold members 120, 122 for forming the end-gated plaque 140 will now be discussed. For example, in a core region 142 of the end-gated plaque 140, a plurality of fibers 144 generally align in a cross-flow orientation with respect to a direction of the flow of the polymeric fluid 52. Further, in shell regions 146, 147 disposed on opposite sides of the core region 142, the plurality of fibers 148, 149, respectively generally align in a flow aligned orientation with respect to a direction of the flow of the polymeric fluid 52. Referring to FIG. 6, an exemplary curve 151 indicating an orientation $A_{11}$ of the fibers along the 1-axis is illustrated. The curve 151 indicates that at a center of the core region (e.g., normalized thickness=0), significantly less than half of the fibers are oriented in the flow direction (e.g., $A_{11}$=0.30). Further, the curve 151 indicates that in the shell region at a normalized thickness of −0.75), significantly more than half of the fibers align with the flow axis (e.g., $A_{11}$=0.79).

For purposes of understanding, a brief explanation of a theory for a standard model for predicting fiber orientation will now be described. The orientation of a single, axisymmetric fiber is described by a unit vector "p" directed along the fiber axis. The orientation in any small region is not uniform, and is described by a probability density function "Ψ(p)." Rather than predict the complete function "Ψ", simulations predict partial information in the form of the second-order orientation tensor "A", which is defined utilizing the following equation:

$$A = \int pp\Psi(p)dp \quad \text{(Equation 150)}$$

where the integral is taken over all possible directions (all values of p). One can define higher-order tensors in the same way, such as the fourth-order tensor A as shown in the following equation:

$$\mathbb{A} = \int pppp\Psi(p)dp \quad \text{(Equation 152)}$$

The orientation of the fibers changes in response to the local velocity gradients, while the fibers themselves translate with the local velocity. The standard approach is to modify Jeffery's equation for the orientation of a single fiber by adding a rotary diffusion term that is proportional to the shear rate. Jeffery's equation is described in the publication "The Motion of Ellipsoidal Particles Immersed in a Viscous Fluid" Proc. Roy. Soc., A102, 161-179, 1922 authored by G. B. Jeffery. The addition of the rotary diffusion term accounts in an approximate way for the effect of fiber—fiber interactions on orientation. Further, a motion of fibers is modeled by substituting the result of Equation 152 into Equation 150, which provides the following equation defining the standard model:

$$\dot{A}^{std} = W \cdot A - A \cdot W + \xi(D \cdot A + A \cdot D - 2\mathbb{A}:D) + 2C_I\dot{\gamma}(I-3A)$$

(Equation 153), wherein $\dot{A}^{std}$ corresponds to tensor indicating a rate of change of orientation of a plurality of fibers disposed in a polymeric fluid, and the superscript "std" denotes that this is the standard model;

"W" corresponds to a vorticity tensor associated with a polymeric fluid and a plurality of fibers disposed in the fluid;

"A" corresponds to an orientation tensor associated with the plurality of fibers;

"ξ" is a constant that depends on fiber aspect ratio, and we use ξ=1;

"D" corresponds to a rate-of-deformation tensor associated with a polymeric fluid and a plurality of fibers disposed in the fluid; and "$\mathbb{A}$" is an approximation of a fourth-order tensor associated with A.

The terms "$2C_I\dot{\gamma}(I-3A)$" corresponds to a rotary diffusion term, wherein "$C_I$" corresponds to an interaction coefficient represents the effect of fiber—fiber interactions associated with the plurality of fibers;

"$\dot{\gamma}$" corresponds to a scalar measure of a rate of deformation of the fluid and the plurality of fibers; and "I" corresponds to a unit tensor.

To use Equation 153, the fourth-order tensor, $\mathbb{A}$, is replaced by a closure formula, which approximates "$\mathbb{A}$" in terms of "A", to obtain accurate closures. The choice of the closure formula affects the accuracy of the results, as well as the value of $C_I$ needed to match experimental data. In one exemplary embodiment, the ORE closure methodology is utilized. The ORE closure methodology is discussed in the publication "Numerical Prediction of Flow-Induced Fiber Orientation in Three-Dimensional Geometries" PhD thesis, University of Illinois at Urbana-Champaign, Urbana, Ill., 1998, authored by B. E. VerWeyst." The Equation 153, or an approximation of it, is solved together with a mass, a momentum, and energy balance equation to predict the fiber orientation in a molded part. One approach is to use a flow solution based on the Hele-Shaw approximation for flow in a thin cavity. The Hele-Shaw approximation is discussed in the publication "Fiber Orientation in Simple Injection Moldings. Part I: Theory and Numerical Methods" Polym. Compos., 13, 317-331, 1992, authored by R. S. Bay and C. L. Tucker III. The application of Equation 153 can also be extended to the full equations of two- and three-dimensional flows. The orientation pattern at the end of filling becomes the ordination pattern in the solid part.

For purposes of understanding, a brief explanation of the mathematical methodology for determining a reduced strain closure model for predicting a rate of change of orientation of a plurality of fibers in a polymeric fluid will be provided. It should be noted that the reduced strain closure model is an objective model, which will give the same result regardless of the coordinate system that is utilized by the model. It should be further noted that the rate of change of orientation of the plurality of fibers in the polymeric fluid can be predicted at predetermined times, and the final orientation of the plurality of fibers can be predicted by integrating the rate of change of orientation of the fibers over time.

The reduced strain closure model is formed by decomposing the Equation 153 for $\dot{A}^{std}$ into rate equations for the eigenvalues and eigenvectors of the tensor "A", modifying the equation for the eigenvalues, and then re-assembling the equations. Because the tensor "A" is symmetric, it can be written in terms of three real eigenvalues $\lambda_i$ and the corresponding unit eigenvectors $e_i$, i=1,2,3, as shown in the following equation:

$$A = \sum_{i=1}^{3} \lambda_i e_i e_i \quad \text{(Equation 155)}$$

It should be noted that the summation convention for repeated subscripts will not be used here; instead all sums will be indicated explicitly. Owing to a definition of "A" we have $0 \leq \lambda_i \leq 1$ and also the following equation:

$$\lambda_1 + \lambda_2 + \lambda_3 = 1 \qquad \text{(Equation 156)}$$

Substituting Equation 155 into both sides of Equation 153 expresses the response of the eigenvalues and eigenvectors in the standard orientation model, as shown in the following equation:

$$\dot{A}^{std} = \sum_{i=1}^{3} \dot{\lambda}_i e_i e_i + \sum_{i=1}^{3} \lambda_i (\dot{e}_i e_i + e_i \dot{e}_i) \qquad \text{(Equation 157)}$$
$$= \sum_{i=1}^{3} [\lambda_i (W \cdot e_i e_i - e_i e_i \cdot W) + \lambda_i \xi (D \cdot e_i e_i + e_i e_i \cdot D) -$$
$$2C_1 \cdot \dot{\gamma}(1 - 3\lambda_i) e_i e_i] - 2\xi \mathbb{A} : D$$

To obtain separate equations for the rates of change of the eigenvalues, we twice take the vector dot product of Equation 157 with one of the unit eigenvectors $e_j$. Further, noting that the eigenvectors are orthonormal, $$e_i \cdot e_j = \delta_{ij},$$

and normal to their own derivatives, $$e_i \cdot \dot{e}_i = 0,$$

the following equation can be derived:

$$\dot{\lambda}_j^{std} = 2\xi(\lambda_j D : e_j e_j - e_j e_j : \mathbf{A} : D) + 2C_1 \dot{\gamma}(1 - 3\lambda_j) \qquad \text{(Equation 158)}$$

To find the change rate for the eigenvectors, Equation 158 is utilized to eliminate "$\dot{\lambda}_i$" from the Equation 157. By utilizing some additional mathematical manipulations, the following equation is obtained:

$$\dot{e}_1^{std} = W \cdot e_1 + \xi \left( \frac{\lambda_1 + \lambda_2 - 2\overline{\mathbb{A}}_{1212}}{\lambda_1 - \lambda_2} \right) D : e_1 e_2 e_2 + \qquad \text{(Equation 159)}$$
$$\xi \left( \frac{\lambda_1 + \lambda_3 - 2\overline{\mathbb{A}}_{1313}}{\lambda_1 - \lambda_3} \right) D : e_1 e_3 e_3$$

"$\overline{\mathbb{A}}_{ijkl}$" denotes a component of the fourth-order orientation tensor in a coordinate system aligned with the eigenvectors $e_1$, $e_2$, and $e_3$. Expressions for $\dot{e}_2$ and $\dot{e}_3$ are written by permuting the indices.

The combination of Equation 158 and Equation 159 is equivalent to Equation 153. It should be noted that the eigenvectors affect the rates of change of the eigenvalues, by positioning them relative to the rate-of-deformation tensor "D". Similarly, the eigenvalues affect the rotation rates of the eigenvectors. Interestingly, the fourth-order tensor "$\mathbf{A}$", and thus the closure approximation, affects both the eigenvalues and the eigenvectors. In contrast, the rotary diffusion term appears only in the eigenvalue equation, since this term is isotropic.

The mathematical description of the reduced-strain closure model will now be completed. The concept of the reduced-strain closure model is to modify the growth rates of the eigenvalues of the orientation tensor "A" by an empirical factor $\kappa < 1$, but to leave the rotation rate expressions for the eigenvectors unchanged. The superscript "RSC" denotes variables associated with the reduced-strain closure model. Further, as discussed above, the superscript "std" denotes variables associated with the standard model. The essence of the reduced-strain closure model is illustrated in the following equations:

$$\dot{\lambda}_i^{RSC} = \kappa \dot{\lambda}_i^{std} \text{ and } \dot{e}_i^{RSC} = \dot{e}_i^{std} \qquad \text{(Equations 160 and 161)}$$

To convert Equations 160 and 161 into a single rate equation for "A", we substitute Equations 160 and 161 in a first portion of Equation 157 to obtain the following equation:

$$\dot{A}^{RSC} = \dot{A}^{std} - (1 - \kappa) \sum_{i=1}^{3} \dot{\lambda}_i^{std} e_i e_i \qquad \text{(Equation 162)}$$

Using Equation 158, the summation in the last term of Equation 162 is:

$$\sum_{i=1}^{3} \dot{\lambda}_i^{std} e_i e_i = 2\xi \sum_{i=1}^{3} [\lambda_i D : e_i e_i e_i e_i - (e_i e_i : \mathbb{A} : D) e_i e_i] + \qquad \text{(Equation 164)}$$
$$2C_1 \dot{\gamma} \sum_{i=1}^{3} [e_i e_i - 3\lambda_i e_i e_i]$$

This can be written more compactly by defining the following two fourth-order tensors:

$$\mathbb{L} = \sum_{i=1}^{3} \lambda_i e_i e_i e_i e_i \text{ and } \mathbb{M} = \sum_{i=1}^{3} e_i e_i e_i e_i \qquad \text{(Equations 166 and 168)}$$

Noting that $\sigma e_i e_i = I$ and using Equation 155, the Equation 164 then becomes:

$$\sum_{i=1}^{3} \dot{\lambda}_i^{std} e_i e_i = 2\xi(\mathbb{L} - \mathbb{M} : \mathbb{A}) + 2C_1 \dot{\gamma}(I - 3A). \qquad \text{(Equation 170)}$$

Combining Equation 170 with Equation 162 and Equation 153 provides the following equation defining one embodiment of the reduced-strain model:

$$\dot{A}^{RSC} = W \cdot A - A \cdot W + \xi \{D \cdot A + A \cdot D - 2[\mathbf{A} + (1-\kappa)(\mathbb{L} - \mathbb{M}:A)] :$$
$$D\} + 2\kappa C_1 \dot{\gamma}(I - 3A)$$

(Equation 172), wherein:

"$\dot{A}^{RSC}$" corresponds to a tensor indicating a rate of change of orientation of a plurality of fibers disposed in a predetermined region of the polymeric fluid;

"W" corresponds to the vorticity tensor associated with a polymeric fluid and a plurality of fibers disposed in the predetermined region;

"A" corresponds to the orientation tensor associated with the plurality of fibers in the predetermined region;

"$\xi$" is a constant that depends on fiber aspect ratio, and we use $\xi=1$;

"D" corresponds to the rate-of-deformation tensor associated with a polymeric fluid and a plurality of fibers disposed in the fluid;

"A" is an approximation of a fourth-order tensor associated with A, that can be obtained from explicit closure methodologies such as the quadratic or hybrid closure methodologies or with an orthotropic closure approximation;

L corresponds to the fourth-order tensor that is calculated from eigenvalues and eigenvectors of A, defined by Equation 166; and

M corresponds to another fourth-order tensor that is calculated from eigenvectors of A, defined by Equation 168.

The terms "$2\kappa C_I \dot{\gamma}(I-3A)$" corresponds to a rotary diffusion term, wherein "$C_I$" corresponds to an interaction coefficient that represents the effect of fiber—fiber interactions associated with the plurality of fibers;

"$\dot{\gamma}$" corresponds to a scalar measure of a rate of deformation of the fluid and the plurality of fibers;

"I" corresponds to a unit tensor; and

"$\kappa$" is a scalar value that reduces a rate of change of orientation of the plurality of fibers due to deformation of the plurality of fibers and the fluid, as compared to the standard model, such that a more accurate prediction of a rate of change of orientation of the fibers is obtained.

The scalar value "$\kappa$" can be adjusted based on least one of the following properties: (i) a property of the fluid, (ii) a property of the fibers, and (iii) an amount of the fibers. The property of the fluid can include viscosity for example. The properties of the fibers can include at least one of: (i) an average length of the fibers, and (ii) an elastic modulus of the fibers. In one exemplary embodiment, the scalar value "$\kappa$" is in a range of 0.05-0.2. Of course, it is contemplated that the scalar value "$\kappa$" could be less than 0.05 or greater than 0.2. The inventors herein have hypothesized that the scalar value "$\kappa$" would decrease from a nominal value when at least one of the following conditions occur: (i) an increase of fiber length from a nominal fiber length, (ii) an increase in amount of fibers from a nominal amount of fibers, (iii) a decrease in the viscosity of the fluid from a nominal viscosity. The inventors herein have further postulated that the scalar value "$\kappa$" would increase from a nominal value when an elastic modulus of the fibers increased from a nominal elastic modulus.

It should be noted that in an alternate exemplary embodiment, the rate of change of orientation of a plurality of fibers in the polymeric fluid can be calculated utilizing the following equation:

$$\dot{A}^{RSC} = W \cdot A - A \cdot W + \xi\{D \cdot A + A \cdot D - 2[\mathbb{A} + (1-\kappa)(\mathbf{L} - \mathbf{M} : \mathbb{A})] : D\}$$ (Equation 174)

Figure 7:
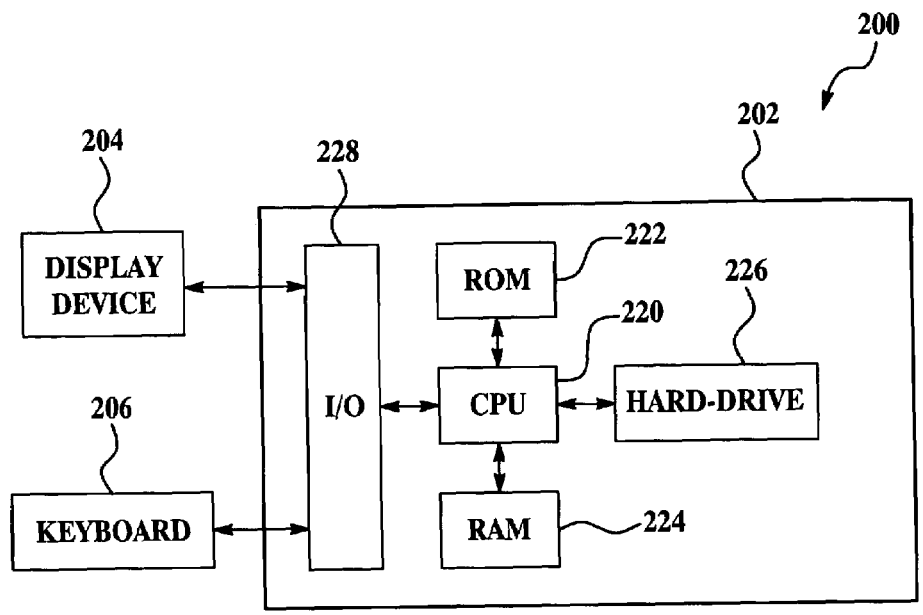
FIG. 7 is a schematic of a system for determining a rate of orientation of a plurality of fibers disposed in a polymeric fluid.

Referring to FIG. 7, a system 200 for predicting a rate of change of a plurality of fibers disposed in a polymeric fluid is illustrated. The system 200 includes a computer 202, a display device 204, and a keyboard 206.

Figure 8:
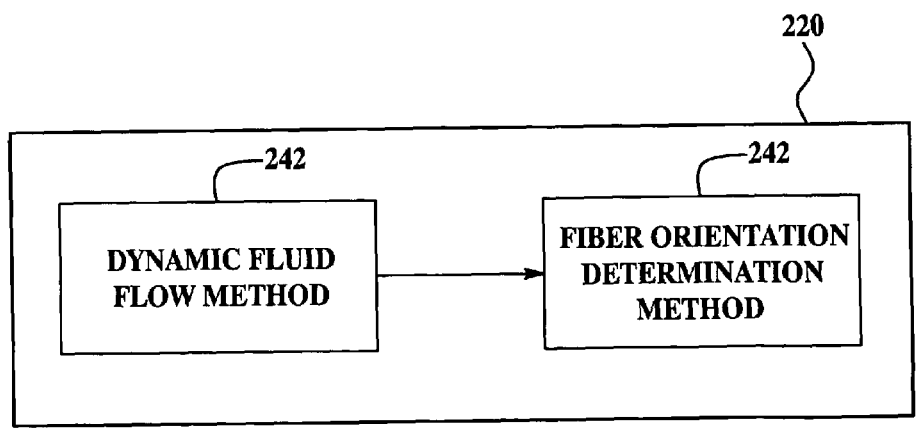
FIG. 8 is block diagram of a dynamic fluid flow method and a fiber orientation determination method utilized by the system of FIG. 7.

Referring to FIGS. 7 and 8, the computer 202 is provided to execute software algorithms for determining a rate of change of orientation of a plurality of fibers disposed in polymeric fluid and for determining a final orientation of the plurality of fibers disposed in the fluid. In particular, the computer 202 is provided to execute a dynamic fluid flow method 240 that models the flow of the polymeric fluid within a cavity defined by molding members. The dynamic fluid flow method 240 is a commercially available software package that iteratively outputs the vorticity tensor "W" and the rate-of-deformation tensor "D" and the velocity vector associated with a fluid and fibers in a predetermined region. The computer 202 is further provided to execute the fiber orientation determination method 242. The method 242 receives the tensors "W" and "D" from the method 240. In one exemplary embodiment, the method 242 utilizes the Equation 172 to determine a rate of change of orientation of a plurality of fibers disposed in a polymeric fluid, and further calculates an orientation of the plurality of fibers in the fluid based on the rate of change of orientation of the plurality of fibers. In another exemplary embodiment, the method 242 utilizes the Equation 174 to determine a rate of change of orientation of a plurality of fibers disposed in a polymeric fluid, and further calculates an orientation of the plurality of fibers in the fluid based on the rate of change of orientation of the plurality of fibers.

The computer 202 includes a central processing unit (CPU) 220, a read-only memory (ROM) 222, a volatile memory such as a random access memory (RAM) 224 an input/output (I/O) interface 228, and a hard-drive 226. The CPU 220 operably communicates with the ROM 222, the RAM 224, the hard-drive 226, and the I/O interface 228. The computer readable media including ROM 222 and RAM 224 and hard-drive 246 may be implemented using any of a number of known memory devices such as PROMs, EPROMs, EEPROMs, flash memory or any other electric, magnetic, optical or combination memory device capable of storing data, some of which represent executable instructions used by the CPU 220. The CPU 220 communicates via the I/O interface 228 with the display device 204 and the keyboard 206.

The display device 204 is provided to display output information from the dynamic fluid flow method 240 and the fiber orientation determination method 242. The display device 204 is operable coupled to the I/O interface 228.

Figure 9:
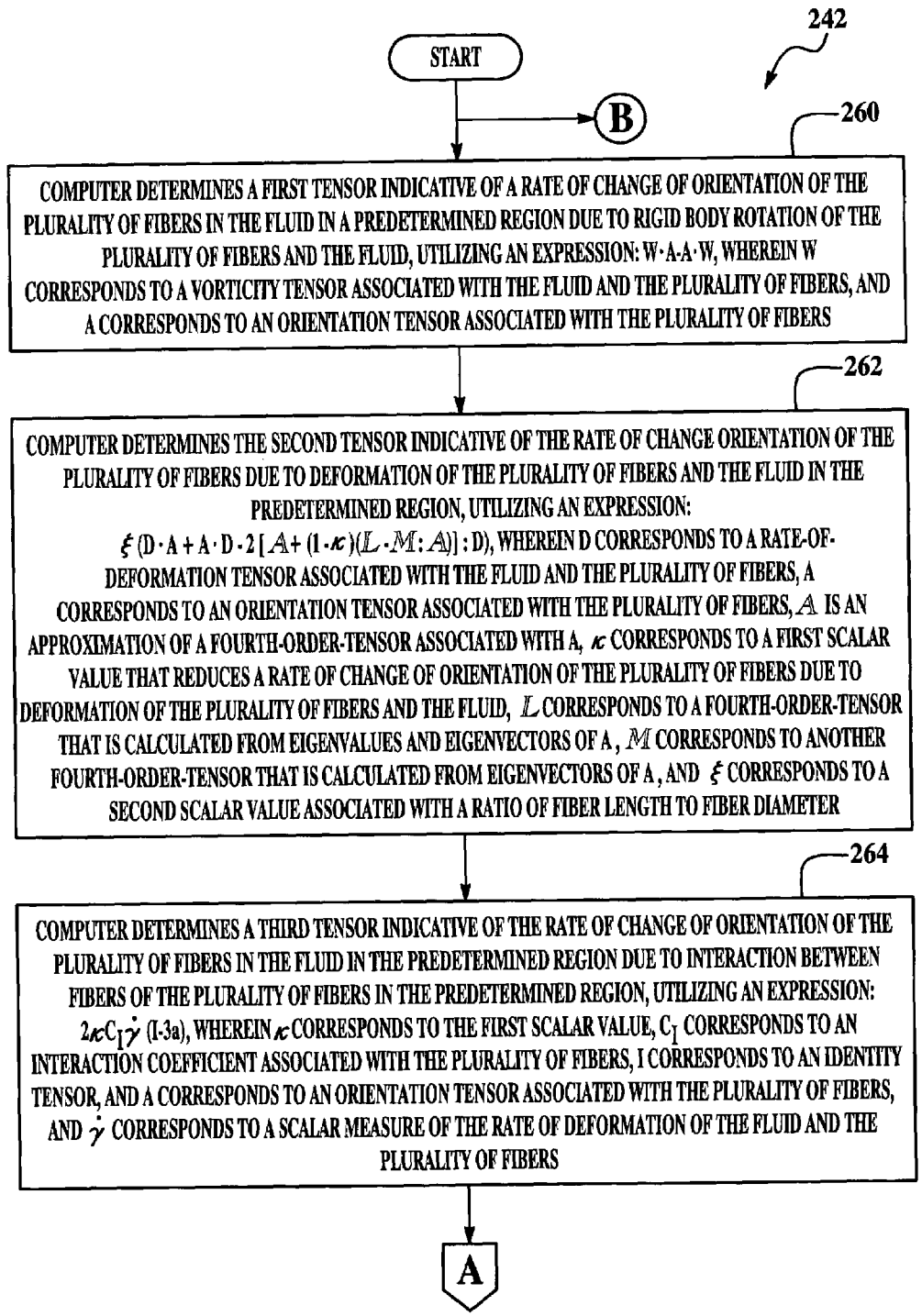
FIGS. 9-10 are flowcharts of the fiber orientation determination method of FIG. 8 in accordance with an exemplary embodiment.
Figure 10:
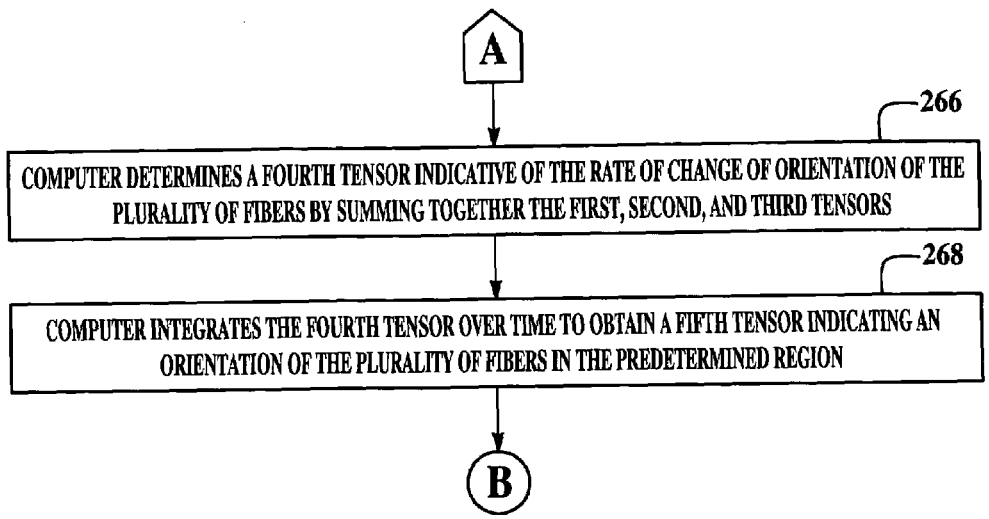

Referring to FIGS. 9-10, the fiber orientation determination method 240 for determining a rate of change of orientation of a plurality of fibers in a fluid in a predetermined region, and an orientation of the fibers based upon the rate of change orientation of the plurality of fibers, in accordance with an exemplary embodiment is provided. It should be noted that the method 240 can be utilized to determine fiber orientation in injection-molding processes, compression molding processes, transfer molding processes, extrusion molding processes, paper making processes, or the like. Further, the method 240 can be utilized to determine fiber orientation in metal-matrix composites. Still further, the method 240 can be utilized to determine fiber orientation in any manufactured part having fibers therein, regardless of part geometry. The method 240 can be implemented in software code stored on a computer readable medium and executed by the computer 202.

At step 260, the computer 202 determines a first tensor indicative of a rate of change of orientation of the plurality of fibers in the fluid in a predetermined region due to rigid body rotation of the plurality of fibers and the fluid, utilizing an expression: $W \cdot A - A \cdot W$, wherein W corresponds to a vorticity tensor associated with the fluid and the plurality of fibers, and A corresponds to an orientation tensor associated with the plurality of fibers.

At step 262, the computer 202 determines a second tensor indicative of the rate of change orientation of the plurality of fibers due to deformation of the plurality of fibers and the fluid in the predetermined region, utilizing an expression: $\xi(D \cdot A + A \cdot D - 2[\mathbb{A} + (1-\kappa)\mathbf{L} - \mathbf{M} : \mathbb{A})]:D)$, wherein D corresponds to a rate-of-deformation tensor associated with the fluid and the plurality of fibers. A corresponds to an orientation tensor associated with the plurality of fibers, $\mathbb{A}$ is an approximation of a fourth-order tensor associated with A, $\kappa$ corresponds to a first scalar value that reduces a rate of change of orientation of the plurality of fibers due to deformation of the plurality of fibers and the fluid, L corresponds to a fourth-order tensor that is calculated from eigenvalues and eigenvectors of A, M corresponds to another fourth-order tensor that is calculated from eigenvectors of A, and ξ corresponds to a second scalar value associated with a ratio of fiber length to fiber diameter.

At step 264, the computer 202 determines a third tensor indicative of the rate of change of orientation of the plurality of fibers in the fluid in the predetermined region due to interaction between fibers of the plurality of fibers in the predetermined region, utilizing an expression: $2\kappa C_I \dot{\gamma}(I-3A)$, wherein κ corresponds to the first scalar value, $C_I$ corresponds to an interaction coefficient associated with the plurality of fibers, I corresponds to an identity tensor, and A corresponds to an orientation tensor associated with the plurality of fibers, and $\dot{\gamma}$ corresponds to a scalar measure of the rate of deformation of the fluid and the plurality of fibers.

At step 266, the computer 202 determines a fourth tensor indicative of the rate of change of orientation of the plurality of fibers by summing together the first, second, and third tensors.

At step 268, the computer 202 integrates the fourth tensor over time to obtain a fifth tensor indicating an orientation of the plurality of fibers in the predetermined region. After step 268, the method 240 returns to step 260.

It should be noted that the steps 260, 262, 264 are utilized to implement the Equation 172 for determining the rate of change orientation of the plurality of fibers in the polymeric fluid. The steps 260, 262, 264 can be executed substantially simultaneously in a single equation as shown in Equation 172.

Figure 11:
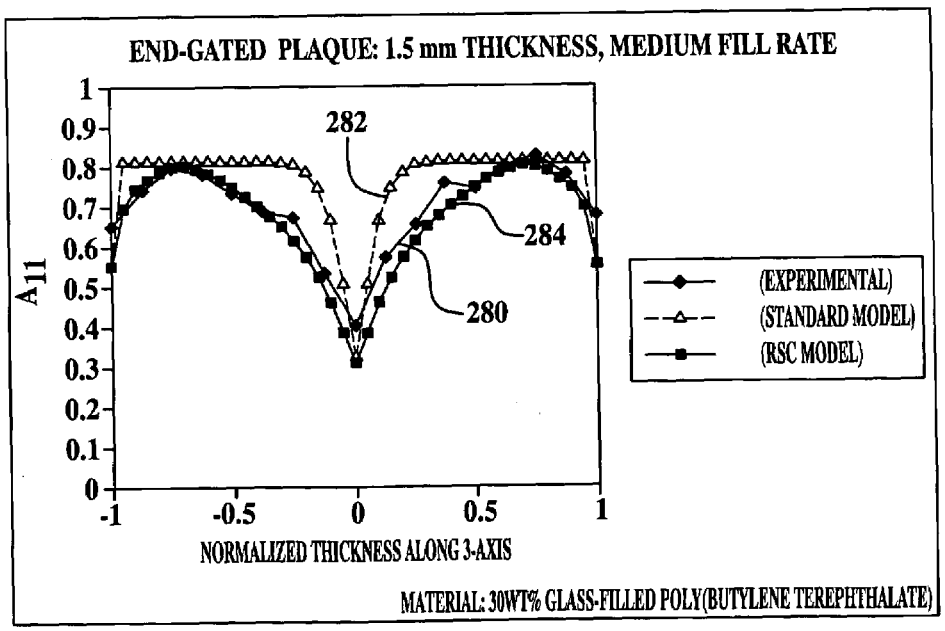
FIG. 11 is a graph of curves indicating an orientation of a plurality of fibers in an end-gated plaque.

Referring to FIG. 11, a graph having curves 280, 282, 284 is provided that indicates an orientation of a plurality of fibers in a hardened polymeric fluid forming an end-gated plaque, utilizing experimental measurements, the standard model, and the method 242 utilizing the reduced-strain closure (RSC) model represented by Equation 172, respectively. The end-gated plaque has a thickness of 1.5 mm and is formed in a cavity that can be filled at various volumetric flow rates over the range of approximately 24-82 cm³/second. A volumetric flow rate of 53 cm³/second was chosen as representative of a medium flow rate. Further, the polymeric fluid comprised a 30 wt % glass-filled polybutylene terephthalate fluid. As shown, curve 284 generated by the method 242 utilizing the RSC model has a relatively high degree of correlation with the curve 280 representing a measured orientation of the fibers. In particular, the curve 284 has a higher degree of correlation with the curve 280, as compared to the curve 282 generated utilizing the standard model.

Figure 12:
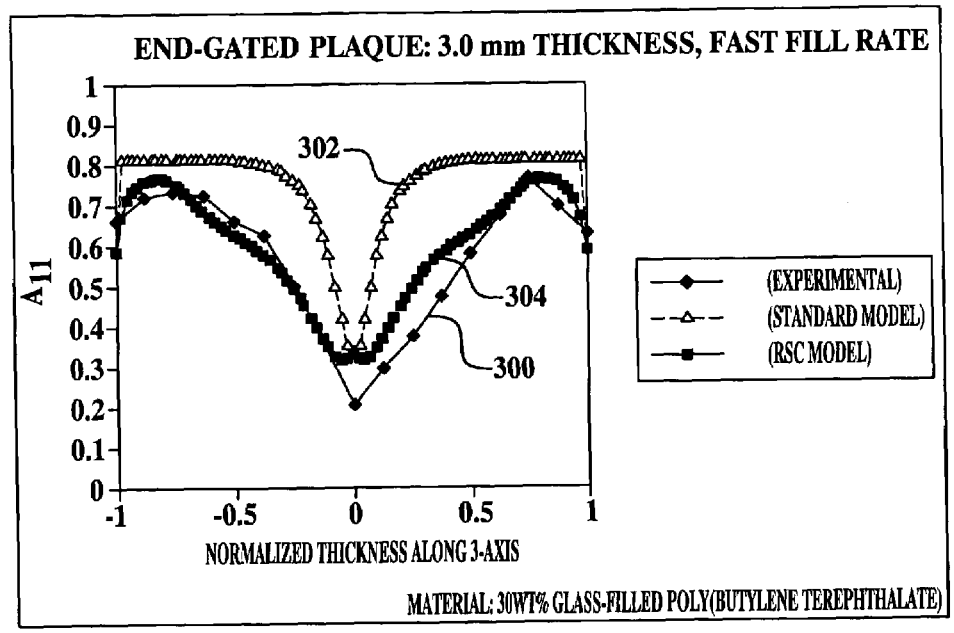
FIG. 12 is a graph of curves indicating an orientation of a plurality of fibers in another end-gated plaque.

Referring to FIG. 12, a graph having curves 300, 302, 304 is provided that indicates an orientation of a plurality of fibers in a hardened polymeric fluid forming an end-gated plaque, utilizing experimental measurements, the standard model, and the method 242 utilizing the reduced-strain closure (RSC) model represented by Equation 172, respectively. The end-gated plaque has a thickness of 3.0 mm and is formed in a cavity that can be filled at various volumetric flow rates over the range of approximately 12-98 cm³/second. A volumetric floe rate of 98 cm³/second was chosen as representative of a fast flow rate. Further, the polymeric fluid comprised a 30 wt % glass-filled polybutylene terephthalate fluid. As shown, curve 304 generated by the method 242 utilizing the RSC model has a relatively high degree of correlation with the curve 300 representing a measured orientation of the fibers. In particular, the curve 304 has a higher degree of correlation with the curve 300, as compared to the curve 302 generated utilizing the standard model.

Figure 13:
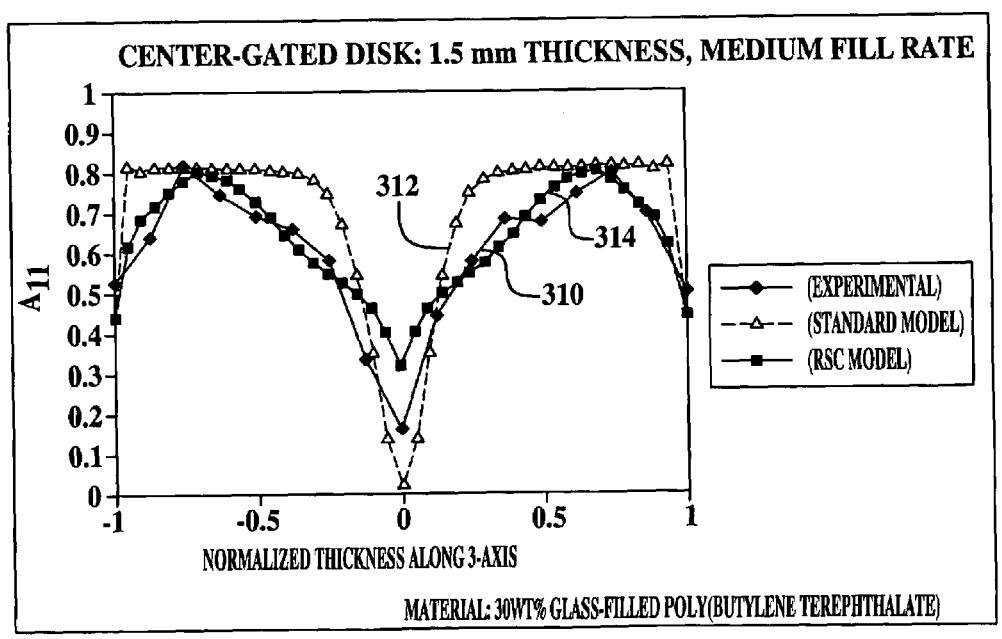
FIG. 13 is a graph of curves indicating an orientation of a plurality of fibers in a center-gated disk.

Referring to FIG. 13, a graph having curves are 310, 312, 314 is provided that indicates an orientation of a plurality of fibers in a hardened polymeric fluid forming a center-gated disk, utilizing experimental measurements, the standard model, and the method 242 utilizing the reduced-strain closure (RSC) model represented by Equation 172, respectively. The center-gated disk has a thickness of 1.5 mm and is formed in a cavity that can be filled at various volumetric flow rates over the range of approximately 24-93 cm³/second. A volumetric flow rate of 54 cm³/second was chosen as representative of a medium flow rate. Further, the polymeric fluid comprised a 30 wt % glass-filled polybutylene terephthalate fluid. As shown, curve 314 generated by the method 242 utilizing the RSC model has a relatively high degree of correlation with the curve 310 representing a measured orientation of the fibers. In particular, the curve 314 has a higher degree of correlation with the curve 310, as compared to the curve 312 generated utilizing the standard model.

Figure 14:
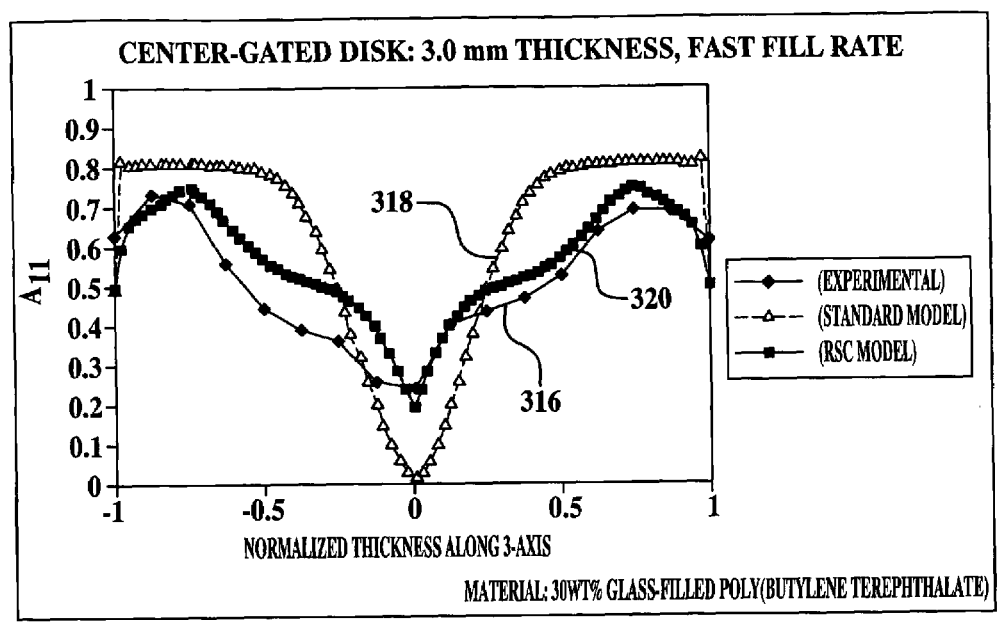
FIG. 14 is a graph of curves indicating an orientation of a plurality of fibers in another center-gated disk.

Referring to FIG. 14, a graph having curves are 316, 318, 320 is provided that indicates an orientation of a plurality of fibers in a hardened polymeric fluid forming a center-gated disk, utilizing experimental measurements, the standard model, and the method 242 utilizing the reduced-strain closure (RSC) model represented by Equation 172, respectively. The center-gated disk has a thickness of 3.0 mm and is formed in a cavity that can be filled at various volumetric flow rates over the range of approximately 12-99 cm³/second. A volumetric flow rate of 99 cm³/second was chosen as representative of a fast flow rate. Further, the polymeric fluid comprised a 30 wt % glass-filled polybutylene terephthalate fluid. As shown, curve 320 generated by the method 242 utilizing the RSC model has a relatively high degree of correlation with the curve 316 representing a measured orientation of the fibers. In particular, the curve 320 has a higher degree of correlation with the curve 316, as compared to the curve 318 generated utilizing the standard model.

Figure 15:
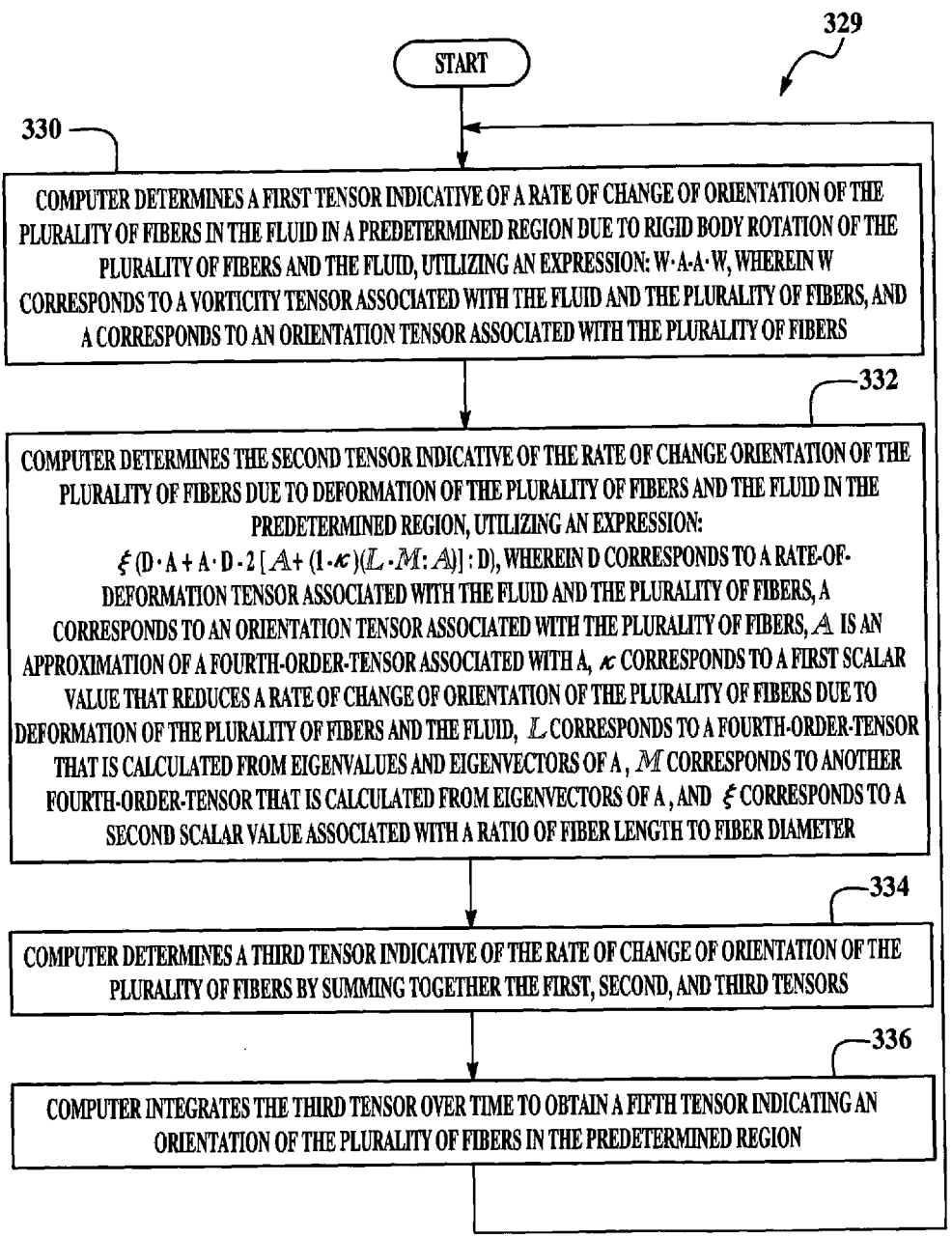
FIG. 15 is a flowchart of another fiber orientation determination method in accordance with another exemplary embodiment.

Referring to FIG. 15, a method 329 for determining a rate of change of orientation of a plurality of fibers in polymeric fluid in a predetermined region, and an orientation of the fibers based upon the rate of change orientation of the plurality of fibers, in accordance with another exemplary embodiment is provided. The method 329 can be implemented in software code stored on a computer readable medium and executed by the computer 202.

At step 330, the computer 202 determines a first tensor indicative of a rate of change of orientation of the plurality of fibers in the fluid in a predetermined region due to rigid body rotation of the plurality of fibers and the fluid, utilizing an expression: $W \cdot A - A \cdot W$, wherein W corresponds to a vorticity tensor associated with the fluid and the plurality of fibers, and A corresponds to an orientation tensor associated with the plurality of fibers.

At step 332, the computer 202 determines a second tensor indicative of the rate of change orientation of the plurality of fibers due to deformation of the plurality of fibers and the fluid in the predetermined reign, utilizing an expression: $\xi(D \cdot A + A \cdot D - 2[\mathbb{A} + (1-\kappa)\mathbb{L} - \mathbb{M}:\mathbb{A})]:D)$, wherein D corresponds to a rate-of-deformation tensor associated with the fluid and the plurality of fibers. A corresponds to an orientation tensor associated with the plurality of fibers, $\mathbb{A}$ is an approximation of a fourth-order tensor associated with A, κ corresponds to a first scalar value that reduces a rate of change of orientation of the plurality of fibers due to deformation of the plurality of fibers and the fluid, $\underline{L}$ corresponds to a fourth-order tensor that is calculated from eigenvalues and eigenvectors of A, $\underline{M}$ corresponds to another fourth-order tensor that is calculated from eigenvectors of A, and $\xi$ corresponds to a second scalar value associated with a ratio of fiber length to fiber diameter.

At step 334, the computer 202 determines a third tensor indicative of the rate of change of orientation of the plurality of fibers by summing together the first and second tensors.

At step 336, the computer 202 integrates the third tensor over time to obtain a fourth tensor indicating an orientation of the plurality of fibers in the predetermined region. After step 336, the method 329 returns to step 330.

It should be noted that the steps 330, 332, 334 are utilized to implement the Equation 174 for determining the rate of change orientation of the plurality of fibers in the polymeric fluid. The steps 330, 332, 334 can be executed substantially simultaneously in a single equation as shown in Equation 174.

Figure 16:
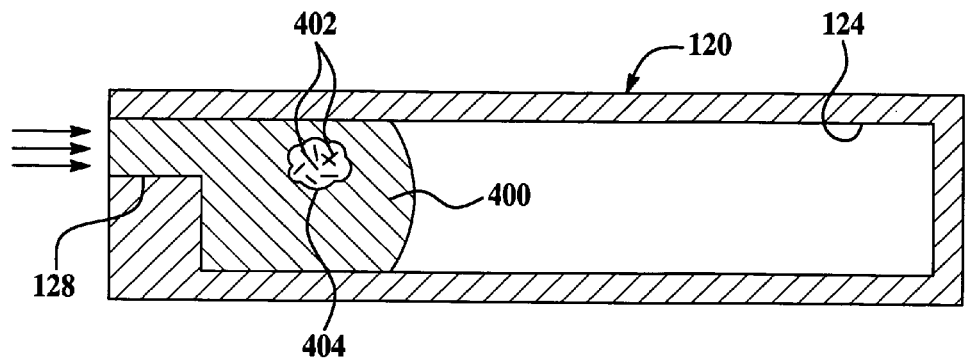
FIG. 16 is a schematic of a mold member that is being filled with a fluid at a time T1.
Figure 17:
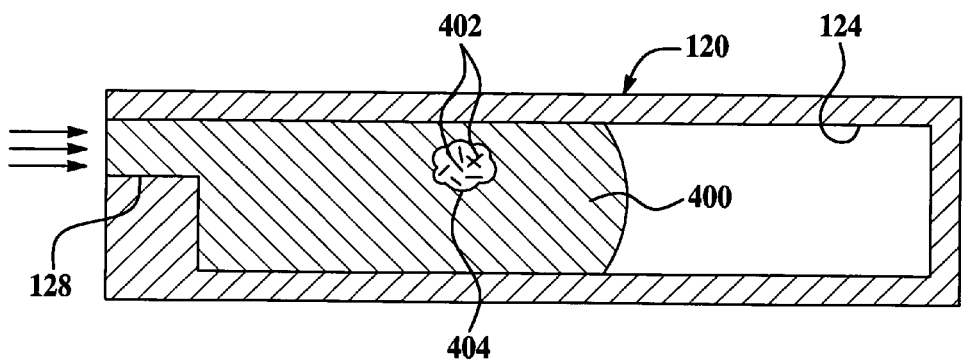
FIG. 17 is a schematic of a mold member that is being filled with a fluid at a time T2.
Figure 18:
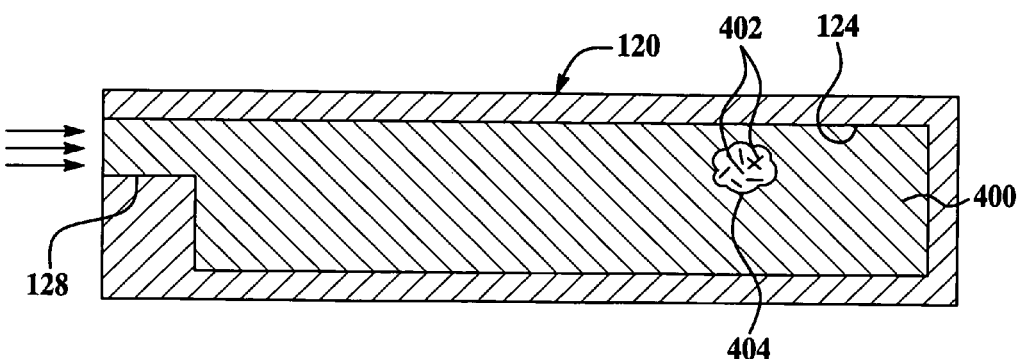
FIG. 18 is a schematic of a mold member that is filled with a fluid at a time T3.

Referring to FIGS. 16-18, a progression of fluid in a cavity 124 of the mold member at discrete instances of time are shown. The FIGS. 16-18 will be utilized to graphically explain of how the fiber orientation determination method 240 determines an orientation of a plurality of fibers in a predetermined region of a fluid at discrete time intervals.

Referring to FIG. 16, at a time T1, a fluid 400 has entered cavity 124 of the mold member 120. For time T1, the method 240 calculates a rate of change of orientation of the plurality of fibers 402 in a predetermined region 404 of the fluid 400. Further, for time T1, the method 240 calculates the orientation of the fibers by integrating the rate of change of orientation of the fibers 401 in the predetermined region 404.

Referring to FIG. 17, at a time T2, the fluid 400 has progressed further into the cavity 124 of the mold members 120. For time T1, the method 240 calculates a rate of change of orientation of the plurality of fibers 402 in the predetermined region 404 of the fluid 400. Further, the method 240 calculates the orientation of the fibers 402 by integrating the rate of change of orientation of the fibers 402.

Referring to FIG. 18, at a time T3, the fluid 400 has filled the cavity 124 of the mold member 120. Accordingly, the orientation of the fibers 402 are now at an orientation that the fibers 402 will have in the finished part. For time T3, the method 240 calculates a rate of change of orientation of the plurality of fibers 402 in the predetermined region 404 of the fluid 400. Further, the method 240 calculates the orientation of the fibers 402 by integrating the rate of change of orientation of the fibers 402.

The method and the article of manufacture for predicting a rate of change of orientation of the plurality of fibers disposed in a fluid provide a substantial advantage over other methods. In particular, the method and article of manufacture utilizes a scalar value "$\kappa$" that allows for a more accurate prediction of the rate of change of orientation of the fibers, and a more accurate prediction of the final orientation of the fibers in an injection molded component or part, as compared to other methods.

As described above, the above-described method can be embodied in the form of computer-implemented processes and apparatuses for practicing those processes. In an exemplary embodiment, the method is embodied in computer program code executed by one or more elements. The present method may be embodied in the form of computer program code containing instructions embodied in tangible media, such as floppy diskettes, CD-ROMs, hard drives, flash memory, or any other computer-readable storage medium, wherein, when the computer program code is loaded into and executed by a computer, the computer becomes an apparatus for practicing the invention. The present method can also be embodied in the form of computer program code, for example, whether stored in a storage medium, loaded into and/or executed by a computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item

What is claimed is:

1. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change or orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein at least one of said first, second and third tensors is determined utilizing a vorticity tensor associated with the fluid and the plurality of fibers and an orientation tensor associated with the plurality of fibers.

2. A method for determining a rate of changes of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein the first tensor is determined utilizing both a vorticity tensor associated with the fluid and the plurality of fibers and an orientation tensor associated with the plurality of fibers.

3. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein the first tensor is determined utilizing an expression: $W \cdot A - A \cdot W$, wherein W corresponds to a vorticity tensor associated with the fluid and the plurality of fibers and A corresponds to an orientation associated with the plurality of fibers.

4. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein the second tensor is further determined utilizing a rate-of-deformation tensor associated with the fluid and the plurality of fibers, an orientation tensor associated with the plurality of fibers, and the first scalar value.

5. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein the second tensor is determined utilizing an expression: $\xi(D \cdot A + A \cdot D - 2[\mathbb{A} + (1-\kappa)\mathbb{L} - \mathbb{M} : A] : D)$, wherein D corresponds to a rate-of-deformation tensor associated with the fluid and the plurality of fibers, A corresponds to an orientation tensor associated with the plurality of fibers, $\mathbb{A}$ is an approximation of a fourth-order tensor associated with A, $\kappa$ corresponds to the first scalar value, $\mathbb{L}$ corresponds to a fourth-order tensor that is calculated from eigenvalues and eigenvectors of A, $\mathbb{M}$ corresponds to another fourth-order tensor that is calculated from eigenvectors of A, and $\xi$ corresponds to a second scalar value associated with a ratio of fiber length to fiber diameter.

6. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

further comprising determining a fourth tensor indicative of the rate of change of orientation of the plurality of fibers in the fluid in the predetermined region due to interaction between fibers of the plurality of fibers in the predetermined region.

7. The method of claim 6, wherein determining the third tensor comprises determining the third tensor indicative of the rate of change of orientation of the plurality of fibers based on the first, second, and fourth tensors.

8. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined regions, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

further comprising determining a fourth tensor indicative of the rate of change of orientation of the plurality of fibers in the fluid in the predetermined region utilizing an expression: $2\kappa C_I \dot{\gamma}(I-3A)$, wherein $\kappa$ correspond to the first scalar value, $C_I$ corresponds to an interaction coefficient associated with the plurality of fibers, I correspond to an identity tensor, A corresponds to an orientation tensor associated with the plurality of fibers, and $\dot{\gamma}$ corresponds to a scalar measure of the rate of deformation of the fluid and the plurality of fibers.

9. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

further comprising:

iteratively performing steps (a), (b), (c) and (d);

integrating the third tensor over time to obtain a fourth tensor indicative of an orientation of the plurality of fibers in the predetermined region; and storing the fourth tensor in the memory device.

10. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein the fluid comprises a thermoplastic fluid.

11. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective sensor; and (d) storing the third tensor in a memory device;

wherein the fluid comprises a thermosetting a polymeric fluid.

12. A method for determining a rate of change of orientation of a plurality of fibers disposed in a fluid, the method comprising:

(a) determining a first tensor indicative of the rate of change of orientation of the plurality of fibers in the fluid in a predetermined region due to rigid body rotation of the plurality of fibers and the fluid;

(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

(c) determining a third tensor indicative of a total rate of change of orientation of the plurality of fibers based on the first and second tensors, wherein the third tensor is an objective tensor; and (d) storing the third tensor in a memory device;

wherein the plurality of fibers comprises one or more of glass fibers, carbon fibers, and aramid fibers.

13. An article of manufacture, comprising:

a computer storage medium having a computer program encoded therein for determining a rate of change of orientation of a plurality of fibers disposed in a fluid, the computer storage medium comprising:

code for determining a first tensor indicative of the rate of change of orientation of the plurality of fibers in the fluid in a predetermined region due to rigid body rotation of the plurality of fibers and the fluid;

code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

code for determining a third tensor indicative of a total rate of change of orientation of the plurality of fibers based on the first and second tensors, wherein the third tensor is an objective tensor; and code for storing the third tensor in a memory device;

wherein at least one of said first, second and third tensors is determined utilizing a vorticity tensor associated with the fluid and the plurality of fibers and an orientation tensor associated with the plurality of fibers.

14. An article of manufacture, comprising:

a computer storage medium having a computer program encoded therein for determining a rate of change of orientation of a plurality of fibers disposed in a fluid, the computer storage medium comprising:

code for determining a first tensor indicative of the rate of change of orientation of the plurality of fibers in the fluid in a predetermined region due to rigid body rotation of the plurality of fibers and the fluid;

code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

code for determining a third tensor indicative of a total rate of change of orientation of the plurality of fibers based on the first and second tensors, wherein the third tensor is an objective tensor; and code for storing the third tensor in a memory device;

wherein the code for determining the first tensor utilizes both a vorticity tensor associated with the fluid and the plurality of fibers and an orientation tensor associated with the plurality of fibers.

15. An article of manufacture, comprising:

a computer storage medium having a computer program encoded therein for determining a rate of change of orientation of a plurality of fibers disposed in a fluid, the computer storage medium comprising:

code for determining a first tensor indicative of the rate of change of orientation of the plurality of fibers in the fluid in a predetermined region due to rigid body rotation of the plurality of fibers and the fluid;

code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

code for determining a third tensor indicative of a total rate of change of orientation of the plurality of fibers based on the first and second tensors, wherein the third tensor is an objective tensor; and code for storing the third tensor in a memory device;

wherein the code for determining the first tensor utilizes an expression: $W \cdot A - A \cdot W$, wherein W corresponds to a vorticity tensor associated with the fluid and the plurality of fibers and A corresponds to an orientation tensor associated with the plurality of fibers.

16. An article of manufacture, comprising:

a computer storage medium having a computer program encoded therein for determining a rate of change of orientation of a plurality of fibers disposed in a fluid, the computer storage medium comprising:

code for determining a first tensor indicative of the rate of change of orientation of the plurality of fibers in the fluid in a predetermined region due to rigid body rotation of the plurality of fibers and the fluid;

code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

code for determining a third tensor indicative of a total rate of change of orientation of the plurality of fibers based on the first and second tensors, wherein the third tensor is an objective tensor; and code for storing the third tensor in a memory device;

wherein the code for determining the second tensor utilizes a rate-of-deformation tensor associated with the fluid and the plurality of fibers, an orientation tensor associated with the plurality of fibers, and the first scalar value.

17. An article of manufacture, comprising:

a computer storage medium having a computer program encoded therein for determining a rate of change of orientation of a plurality of fibers disposed in a fluid, the computer storage medium comprising:

code for determining a first tensor indicative of the rate of change of orientation of the plurality of fibers in the fluid in a predetermined region due to rigid body rotation of the plurality of fibers and the fluid;

code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

code for determining a third tensor indicative of a total rate of change of orientation of the plurality of fibers based on the first and second tensors, wherein the third tensor is an objective tensor; and code for storing the third tensor is a memory device;

wherein the code for determining the second tensor utilizes an expression: $\xi(D \cdot A + A \cdot D - 2[\mathbb{A} + (1-\kappa)\mathbb{L} - \mathbb{M}:\mathbb{A}]:D)$, wherein D corresponds to a rate-of-deformation tensor associated with the fluid and the plurality of fibers, A corresponds to an orientation tensor associated with the plurality of fibers, $\mathbb{A}$ is an approximation of a fourth-order tensor associated with A, $\kappa$ corresponds to the first scalar value, $\mathbb{L}$ corresponds to a fourth-order tensor that is calculated from eigenvalues and eigenvectors of A, $\mathbb{M}$ corresponds to another fourth-order tensor that is calculated from eigenvectors of A, and $\xi$ corresponds to a second scalar value associated with a ratio of fiber length to fiber diameter.

18. An article of manufacture, comprising:

a computer storage medium having a computer program encoded therein for determining a rate of change of orientation of a plurality of fibers disposed in a fluid, the computer storage medium comprising:

code for determining a first tensor indicative of the rate of change of orientation of the plurality of fibers in the fluid in a predetermined region due to rigid body rotation of the plurality of fibers and the fluid;

code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;

code for determining a third tensor indicative of a total rate of change of orientation of the plurality of fibers based on the first and second tensors, wherein the third tensor is an objective tensor; and code for storing the third tensor in a memory device;

wherein the computer storage medium further comprises code for determining a fourth tensor indicative of the rate of change of orientation of the plurality of fibers in the fluid in the predetermined region due to interaction between fibers on the plurality of fibers in the predetermined region.

19. The article of manufacture of claim 18, wherein the code for determining the third tensor determines the third tensor indicative of the rate of change of orientation of the plurality of fibers based on the first, second, and fourth tensors.

20. An article of manufacture, comprising:
a computer storage medium having a computer program encoded therein for determining a rate of change of orientation of a plurality of fibers disposed in a fluid, the computer storage medium comprising:
code for determining a first tensor indicative of the rate of change of orientation of the plurality of fibers in the fluid in a predetermined region due to rigid body rotation of the plurality of fibers and the fluid;
code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;
code for determining a third tensor indicative of a total rate of change of orientation of the plurality of fibers based on the first and second tensors, wherein the third tensor is an objective tensor; and
code for storing the third tensor in a memory device;
wherein the computer storage medium further comprises code for determining a fourth tensor indicative of the rate of change of orientation of the plurality of fibers in the fluid in the predetermined region utilizing an expression $2\kappa C_I \dot{\gamma}(I-3A)$, wherein $\kappa$ corresponds to the first scalar value, $C_I$ corresponds to an interaction coefficient associated with the plurality of fibers, I corresponds to an identity tensor, A corresponds to an orientation tensor associated with the plurality of fibers, and $\dot{\gamma}$ corresponds to a scalar measure of the rate of deformation of the fluid and the plurality of fibers.

21. An article of manufacture, comprising:
a computer storage medium having a computer program encoded therein for determining a rate of change of orientation of a plurality of fibers disposed in a fluid, the computer storage medium comprising:
code for determining a first tensor indicative of the rate of change of orientation of the plurality of fibers in the fluid in a predetermined region due to rigid body rotation of the plurality of fibers and the fluid;
code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;
code for determining a third tensor indicative of a total rate of change of orientation of the plurality of fibers based on the first and second tensors, wherein the third tensor is an objective tensor; and
code for storing the third tensor in a memory device;
wherein the computer storage medium further comprises:
code for iteratively executing the code for determining the first tensor, the code for determining the second tensor, the code for determining the third tensor, and the code for storing the third tensor in the memory device;
code for integrating the third tensor over time to obtain a fourth tensor indicative of an orientation state of the plurality of fibers in the predetermined region; and
code for storing the fourth tensor in the memory device.

22. A method for determining a rate of change of orientation of a plurality of fibers disposed in a fluid, the method comprising:
(a) determining a first tensor indicative of the rate of change of orientation of the plurality of fibers in the fluid in a predetermined region due to rigid body rotation of the plurality of fibers and the fluid;
(b) determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid; and
(c) determining a third tensor indicative of a total rate of change of orientation of the plurality of fibers based on the first and second tensors, wherein the third tensor is an objective tensor; and
(d) displaying output information associated with the third tensor on a display device;
wherein at least one of said first, second and third tensors is determined utilizing a vorticity tensor associated with the fluid and the plurality of fibers and an orientation tensor associated with the plurality of fibers.

23. An article of manufacture, comprising:
a computer storage medium having a computer program encoded therein for determining a rate of change of orientation of a plurality of fibers disposed in a fluid, the computer storage medium comprising:
code for determining a first tensor indicative of the rate of change of orientation of the plurality of fibers in the fluid in a predetermined region due to rigid body rotation of the plurality of fibers and the fluid;
code for determining a second tensor indicative of the rate of change of orientation of the plurality of fibers in the fluid in the predetermined region due to deformation of the plurality of fibers and the fluid in the predetermined region, utilizing a first scalar value that reduces the rate of change of orientation of the plurality of fibers due to deformation of the plurality of fibers and the fluid;
code for determining a third tensor indicative of a total rate of change of orientation of the plurality of fibers based on the first and second tensors, wherein the third tensor is an objective tensor; and
code for displaying output information associated with the third tensor on a display device;
wherein at least one of said first, second and third tensors is determined utilizing a vorticity tensor associated with the fluid and the plurality of fibers and an orientation tensor associated with the plurality of fibers.

* * * * *